United States Patent
Zhang et al.

(10) Patent No.: US 9,335,485 B2
(45) Date of Patent: May 10, 2016

(54) USING AN OPTICAL EXPANDER/CONDENSER TO ACHIEVE A COMPACT BEAM STRUCTURE FOR A MULTI-CHANNEL OPTICAL ROTARY JOINT

(71) Applicants: Boying B Zhang, Lawrenceville, NJ (US); Hong Zhang, North Brunswick, NJ (US); Louis D. Violante, Monroe, NJ (US)

(72) Inventors: Boying B Zhang, Lawrenceville, NJ (US); Hong Zhang, North Brunswick, NJ (US); Louis D. Violante, Monroe, NJ (US)

(73) Assignee: PRINCETEL INC., Hamilton, NJ (US)

( * ) Notice: Subject to any disclaimer, the term of this patent is extended or adjusted under 35 U.S.C. 154(b) by 21 days.

(21) Appl. No.: 14/332,938

(22) Filed: Jul. 16, 2014

(65) Prior Publication Data
US 2016/0018599 A1    Jan. 21, 2016

(51) Int. Cl.
| | |
|---|---|
| *G02B 6/26* | (2006.01) |
| *G02B 6/28* | (2006.01) |
| *G02B 6/32* | (2006.01) |
| *G02B 27/30* | (2006.01) |
| *G02B 6/36* | (2006.01) |
| *G02B 6/293* | (2006.01) |

(52) U.S. Cl.
CPC ................ *G02B 6/3604* (2013.01); *G02B 6/28* (2013.01); *G02B 6/29395* (2013.01); *G02B 6/32* (2013.01); *G02B 6/3628* (2013.01); *G02B 27/30* (2013.01)

(58) Field of Classification Search
CPC .......... G02B 6/28; G02B 6/32; G02B 6/3604; G02B 6/3628; G02B 3/29395; G02B 27/30
USPC .......................... 385/24–28, 33; 359/619, 641
See application file for complete search history.

(56) References Cited

U.S. PATENT DOCUMENTS 8,369,662 B2 *    2/2013   Popp .................... G02B 6/3604
                                                      359/619

* cited by examiner

*Primary Examiner* — Akm Enayet Ullah
*Assistant Examiner* — Michael Mooney

(57) ABSTRACT

The multiple channel fiber optic rotary joint of this invention can transmit an increased number of optical signals simultaneously through the de-rotating mechanism without increasing the size of the de-rotating mechanism. It also allows for the recapturing of the signals with relative ease. This is accomplished through the use of an optical condenser and/or an optical expander that reduces or expands the overall all beam structure without significantly altering the relative structure. The expanders and condensers are inverse structures in that if an optical signal is condensed when passing from right to light through the condenser it is expanded when passing left to right through the same condenser.

12 Claims, 2 Drawing Sheets

USING AN OPTICAL EXPANDER/CONDENSER TO ACHIEVE A COMPACT BEAM STRUCTURE FOR A MULTI-CHANNEL OPTICAL ROTARY JOINT

This application is a division application and claims priority of U.S. patent application Ser. No. 13/188,123 filed on Jul. 21, 2011.

This application claims priority of U.S. Provisional Patent Application No. 61/421,299 filed date: Dec. 9, 2010.

BACKGROUND OF THE INVENTION

The present invention relates generally to the field of apparatus for fiber optic communication, and more particularly, to a multi-channel fiber optic rotary joint using an optical expander/condenser to achieve a compact beam structure.

A typical multiply channel fiber optic rotary joint consists of rotatable fiber collimator array, a de-rotating mechanism, and the fixed fiber collimator array all of which rotate about a common axis. The de-rotating mechanism allows the light signals applied to any one or all of a number of inputs to be reproduced at a corresponding number of outputs of the fiber optic rotary joint in a continuous manner. The de-rotating mechanism normally consists of an optical de-rotating mechanics such as a Dove prism, Delta prism, Schmidt-Pechan prism, Abbe-Konig prism, K-mirror, or GRIN lens to name a few and a passive mechanical system which rotates the optical de-rotating mechanism.

The determining factor for the size of these multi-channel fiber optic rotary joints is the size of the de-rotating mechanism which is a function of the number of beams that can be passed through the de-rotating mechanism simultaneously. The number of beams was traditionally limited by the physical size of the collimators and collimator arrays. Therefore, even in the most tightly packed beam structure would have a relatively low number of beams per square millimeter because the amount of space occupied by the collimators and collimator arrays is vastly larger than the beam size resulting in a relatively long distance between neighboring beams.

Optical expanders and optical condenser are extensively used to achieve magnification or demagnification. They are essentially telescopes or magnifying glasses which achieve their magnification or demagnification through the use of refractors.

Figure 1:
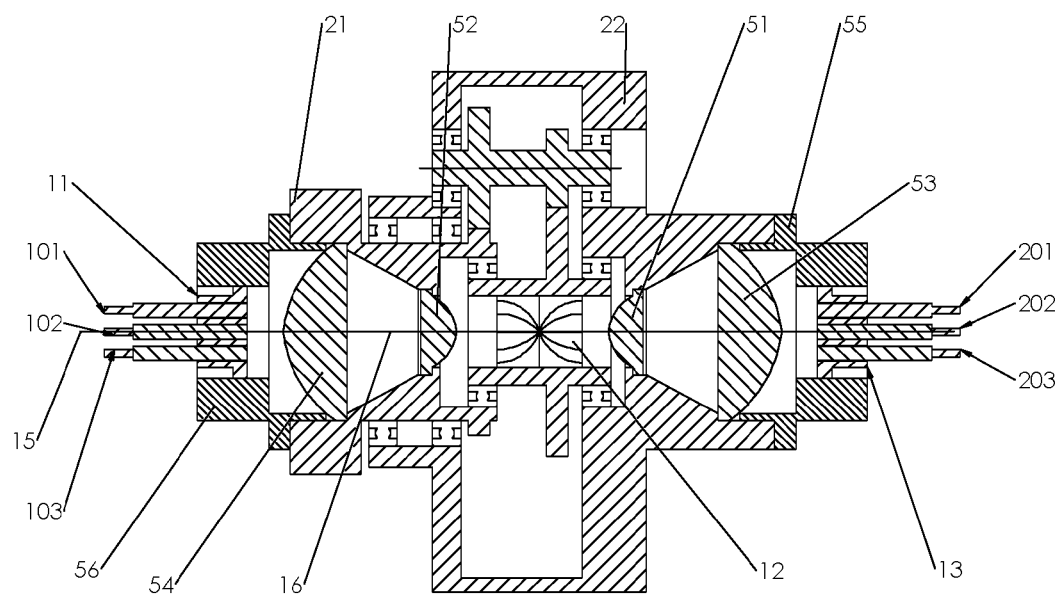
FIG. 1 is a cross sectional view of a multi-channel fiber optic rotary joint with an optical condenser and optical expander of configuration 1 described below.

SUMMARY OF INVENTION the present invention in FIGS. 1, 2, 3 and 4 use an optical condenser between the collimators on the rotor side (101, 102, 103 . . . ) and the de-rotating mechanism (12) to reduce the distance between neighboring beams, increasing the number of beams per square millimeter, and allowing for a significant increase in the number of beams that can pass through de-rotating mechanism (12) simultaneously without altering the size of the de-rotating mechanism (12), the rotatable fibers collimators array (11) or the individual collimators (101, 102, 103 . . . ).

An optical expander is used between the de-rotating mechanism (12) and the collimators on the stator side (201, 202, 203, . . . ) to increase the distance beam neighboring beams, reducing the number of beams per square millimeter, enabling the beams to be re-capturing relatively easily without altering the size of the fixed fibers collimators array (13) or the size of the individual collimators (201, 202, 203 . . . ).

Also while they are being presented together in the figures above; both the optical expanders and the optical condensers can be used independent of each other.

DESCRIPTION OF INVENTION

The present invention in FIGS. 1, 2, 3 and 4 consist of a rotatable fiber collimator array (11), a rotor (21), a de-rotating mechanism (12), a stator, an optical condenser and an optical expander all rotate about a common axis (15).

The de-rotating mechanism (12) allows the light signals applied to any one or all of a number of inputs to be reproduced at a corresponding number of outputs of the fiber optic rotary joint in a continuous manner.

Condenser Configuration 1—The optical condenser in FIG. 1 consists of a cover (56) and two optical elements which are both positive refractors (54, 52).

The cover (56) holds the rotatable fibers collimators array (11) such that all of the all of the collimators in said array (101, 102, 103 . . . ) are parallel to the common axis of rotation (15). The optical elements of the condenser (52, 54) within the rotor (21) of the multi-channel fiber optic rotary joint aligned along the common axis of rotation (15).

The first refractor (54) in the optical condenser receives the light from the collimators (101, 102, 103 . . . ) and bends the light towards the refractors' focal point (16) condensing the beam structure. The second refractor (52) in the optical condenser receives the light from the first refractor (54) and collimates the individual beams of light so they are all parallel to the common axis of rotation (15) before they pass through the de-rotating mechanism (12). The refractors are chosen based on many factors; such as cost, availability and on the design requirements to name a few. However, in general they are chosen such that the ratio of the focal length of the second refractor (52), to the focal length of the first refractor (54), equals the de-magnification required to pass all of the beams through the de-rotating mechanism (12) simultaneously. The distance between the two refractors (52, 54) would be equal to the sum of their focal lengths Expander Configuration 1—The optical expander in FIG. 1 consists of a cover (55) and two optical elements which are both positive refractors (51, 53)

The cover (55) holds the fixed fibers collimators array (13) such that all of the all of the collimators in said array (201, 202, 203 . . . ) are parallel the common axis of rotation (15). The optical elements of the expander (51, 53) are contained within the stator (22) of the multi-channel fiber optic rotary joint and are aligned along the common axis of rotation (15).

The first refractor (51) in the optical expander is receives the light from the de-rotating mechanism (12) and bends the light pass the common axis of rotation (15) towards the second refractor expanding the beam structure. The second refractor (53) in the optical expander receives the light from the first refractor (51) and collimates the individual beams of light so they are all parallel with respect to the common axis of rotation (15) before sending them to the collimators in the fixed fiber collimator array (13). The refractors (51, 53) are chosen based on many factors; such as cost, availability and on the design requirements to name a few. However, in general they are chosen such that the ratio of the focal length of the second refractor (53), to the focal length of the first refractor (51), equals the magnification required to capture the beams with the collimators (201, 202, 203 . . . ) in the fixed collimator array (13). The distance between the two refractors (51, 53) would be equal to the sum of their focal lengths.

Figure 2:
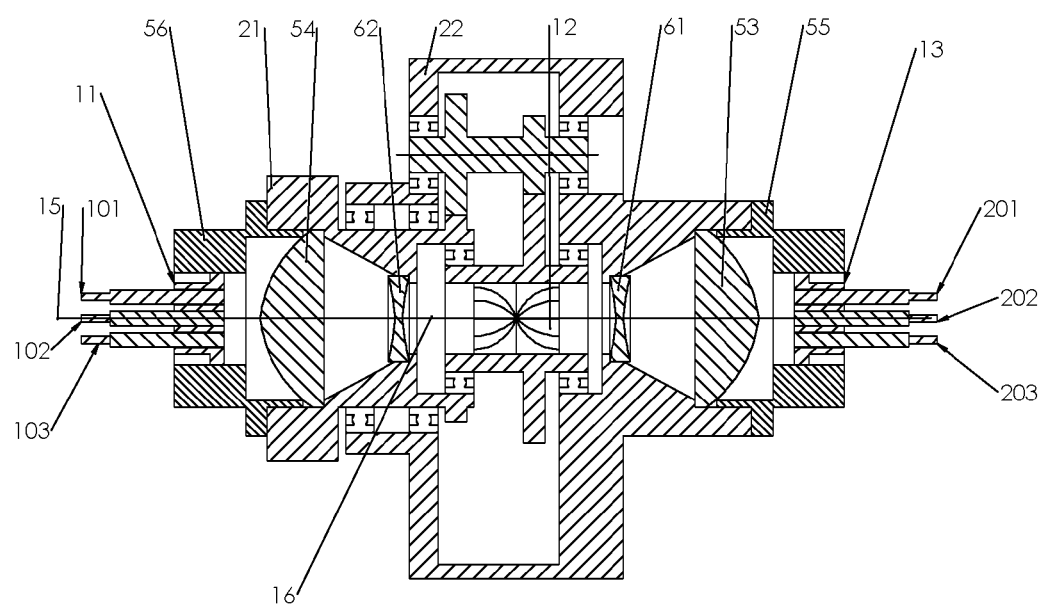
FIG. 2 is a cross sectional view of a multi-channel fiber optic rotary joint with an optical condenser and optical expander of configuration 2 described below.

Condenser Configuration 2—The optical condenser in FIG. 2 consists of a cover (56) and two optical elements, one positive refractor (54) and one is a negative refractor (62).

The cover (56) holds the rotatable fibers collimators array (11) such that all of the all of the collimators (101, 102, 103 . . . ) in said array are parallel to the common axis of rotation (15). The optical elements of the condenser (54, 62) within the rotor (21) of the multi-channel fiber optic rotary joint aligned along the common axis of rotation (15).

The first refractor in the optical condenser the positive refractor (54); it receives the light from the collimators (103, 102, 103 . . . ) within the rotatable fiber collimator array (11) and bends the light towards the refractors' focal point (16) condensing the beam structure. The second refractor in the optical condenser is a negative refractor (62). It receives the light from the first refractor (54) and collimates the individual beams of light so they are all parallel with respect to the common axis of rotation (15) before they pass through the de-rotating mechanism (12). The refractors (54, 62) are chosen based on many factors; such as cost, availability and on the design requirements to name a few. However, in general they are chosen such that the ratio of the focal length of the second refractor (62), to the focal length of the first refractor (54), equals the de-magnification required to pass all of the beams through the de-rotating mechanism (12) simultaneously. The distance between the two refractors (54, 62) would be equal to the difference of their focal lengths.

Expander Configuration 2—The optical expander in FIG. 2 consists of a cover (55) and two optical elements, one positive refractor (53) and one is a negative refractor (61).

The cover (55) holds the fixed fibers collimators array (13) such that all of the all of the collimators (201, 202, 203 . . . ) in said array are parallel the common axis of rotation (15). The optical elements of the expander (53, 61) are contained within the stator (22) of the multi-channel fiber optic rotary joint and are aligned along the common axis of rotation (15).

The first refractor in the optical expander is a negative refractor (61); it receives the light from the de-rotating mechanism (12) and bends the light away from the common axis of rotation (15) and towards the second refractor (53) expanding the beam structure. The second refractor in the optical expander is a positive refractor (53). It receives the light from the first refractor (61) and collimates the individual beams of light so they are all parallel to the common axis of rotation (15) before sending them to the collimators (201, 202, 203 . . . ) in the fixed fiber collimator array (13). The refractors (53, 61) are chosen based on many factors; such as cost, availability and on the design requirements to name a few. However, in general they are chosen such that the ratio of the focal length of the second refractor (53), to the focal length of the first refractor (61), equals the magnification required to capture the beams with the collimators (201, 202, 203 . . . ) in the fixed collimator array (13). The distance between the two refractors (53, 61) would be equal to the difference of their focal lengths.

Figure 3:
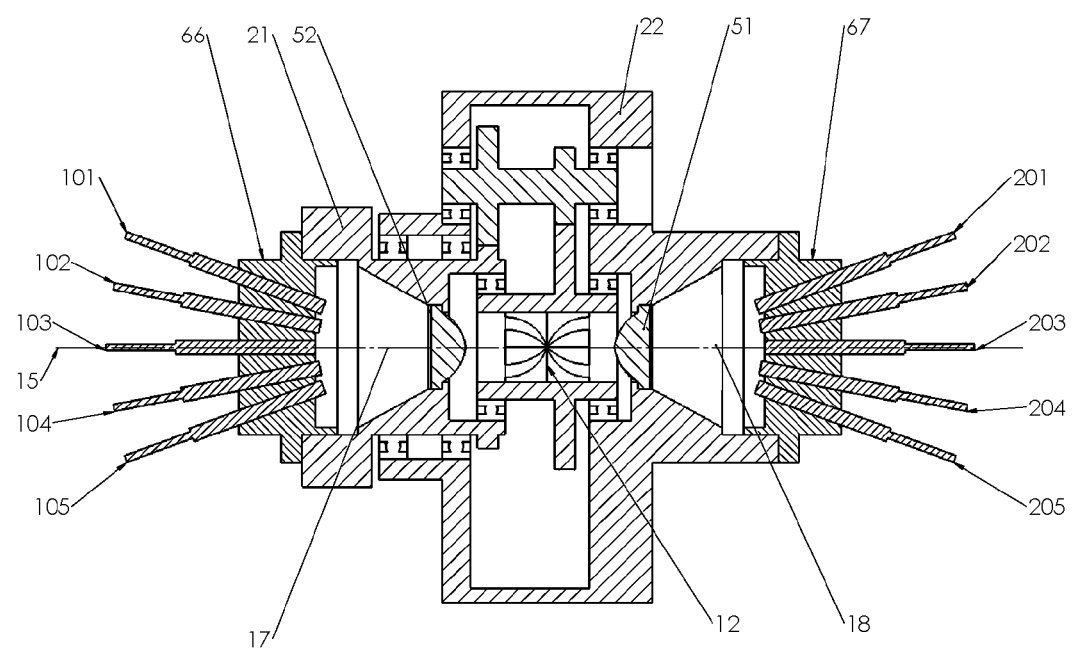
FIG. 3 is a cross sectional view of a multi-channel fiber optic rotary joint with an optical condenser and optical expander of configuration 3 described below.

Condenser Configuration 3—The optical condenser consists in FIG. 3 of a cover (66) and a positive refractor (52)

The cover (66) holds the collimators (101, 102, 103 . . . ) in such a way that all of the light beams emanating from the individual collimators intersect at a single point (17) along the common axis of rotation (15). The optical element of the condenser (66) is within the rotor (21) of the multi-channel fiber optic rotary joint aligned along the common axis of rotation (15).

The refractor (52) receives the light from the collimators (101, 102, 103 . . . ) and bends it towards the de-rotating mechanism (12) at the same time it collimates the individual beams of light so they are all parallel to the common axis of rotation (15). The refractor (52) is chosen based on many factors; such as cost, availability and on the design requirements to name a few. However, in general it is chosen such that the ratio of the focal length of the refractor (52), to the axial distance between the collimator and the focal point of the light beams (17), equals the de-magnification required to pass all of the beams through the de-rotating mechanism (12) simultaneously. The distance between the focal point of the light beams (17) and the refractor (52) would be equal to the focal length of the refractor. Further the focal point would be between the cover (66) and the refractor (52).

Expander Configuration 3—The optical expander in FIG. 3 consists of a cover (67) and a positive refractor (51)

The cover (67) holds the collimators (201, 202, 203 . . . ) in such a way that if light beams were emanating from all of the individual collimators they would intersect at a single point (18) along the common axis of rotation (15). The optical element (51) of the condenser is within the stator (22) of the multi-channel fiber optic rotary joint aligned along the common axis of rotation (15).

The refractor (51) receives the light from the de-rotating mechanism (12) and bends it through the focal point of the collimators (18) pass the common axis of rotation (15) towards the collimators (201, 202, 203 . . . ) in the cover (67). The refractor (52) is chosen based on many factors; such as cost, availability and on the design requirements to name a few. However, in general it is chosen such that the ratio of the focal length of the refractor, to the axial distance between the collimator (201, 202, 203 . . . ) and the focal point of the collimators (18), equals the magnification required to capture the beams with the collimators (201, 202, 203 . . . ) in the cover (67). The distance between the focal point of the collimators (18) and the refractor (51) would be equal to the focal length of the refractor. Further the focal point would be between the cover (67) and the refractor (51).

Figure 4:
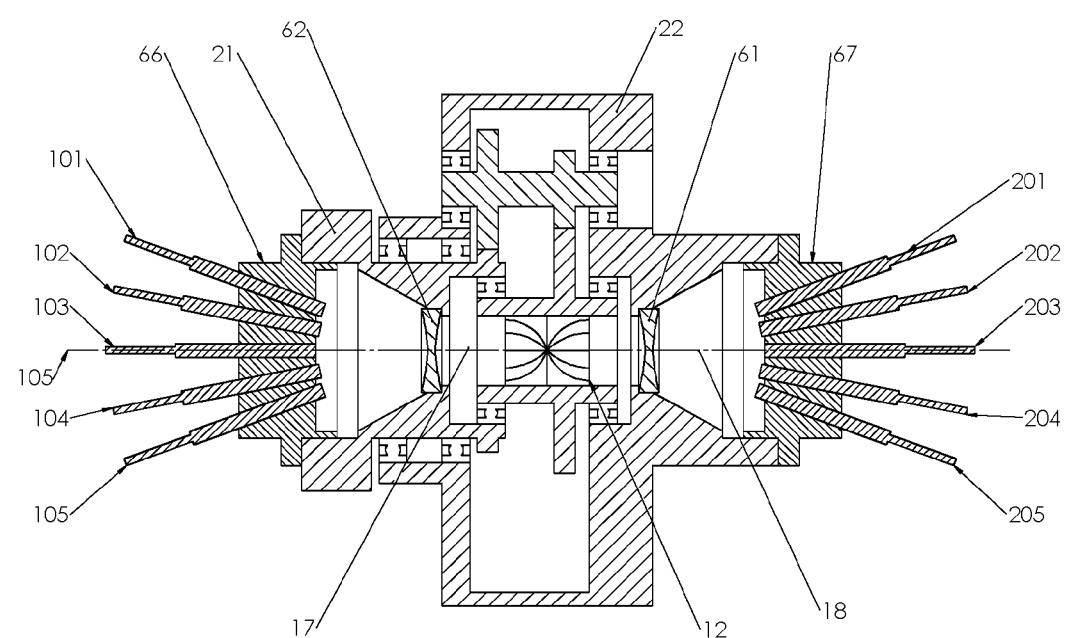
FIG. 4 is a cross sectional view of a multi-channel fiber optic rotary joint with an optical condenser and optical expander of configuration 4 described below.

Condenser Configuration 4—The optical condenser in FIG. 4 consists of a cover (66) and a negative refractor (62).

The cover (66) holds the collimators (101, 102, 103 . . . ) in such a way that all of the light beams emanating from the individual collimators intersect at a single point (17) along the common axis of rotation (15). The optical element of the condenser is within the rotor (21) of the multi-channel fiber optic rotary joint aligned along the common axis of rotation (15).

The refractor (62) receives the light from the collimators (101, 102, 103 . . . ) bends it towards the de-rotating mechanism (12) at the same time it collimates the individual beams of light so they are all parallel to the common axis of rotation (15). The refractor (62) is chosen based on many factors; such as cost, availability and on the design requirements to name a few. However, in general it is chosen such that the ratio of the focal length of the refractor (62), to the axial distance between the collimator (101, 102, 103 . . . ) and the focal point of the collimators (17), equals the de-magnification required to pass all of the beams through the de-rotating mechanism (12) simultaneously. The distance between the focal point of the collimators (17) and the refractor (62) would be equal to the focal length of the refractor. Further the focal point of the collimators (17) would be between the de-rotating mechanism (12) and the refractor (62).

Expander Configuration 4—The optical condenser in FIG. 4 consists of a cover (67) and a negative refractor (61)

The cover (67) holds collimators (201, 202, 203 . . . ) in such a way that if light beams were emanating from all of the individual collimators (201, 202, 203 . . . ) they would intersect at a single point (18) along the common axis of rotation (15). The optical element (61) of the condenser is within the stator (22) of the multi-channel fiber optic rotary joint aligned along the common axis of rotation (15).

The refractor (61) receives the light from the de-rotating mechanism (12) and bends away from the common axis of rotation (15) towards the collimators (201, 202, 203 . . . ) in the cover ((67). The refractor (61) is chosen based on many factors; such as cost, availability and on the design requirements to name a few. However, in general it is chosen such that the ratio of the focal length of the refractor (61), to the axial distance between the collimator (201, 202, 203 . . . ) and the focal point of the collimators (18), equals the magnification required to capture the beams with the collimators (201, 202, 203 . . . ) in the cover (67). The distance between the focal point of the collimators (18), and the refractor (61) would be equal to the focal length of the refractor (61). Further the focal point of the collimators (18) would be between the de-rotating mechanism (12) and the refractor (61).

We claim:

1. A bi-directional multichannel fiber optic rotary joint comprising: a first collimator array with a rotary axis; a second collimator array with a rotary axis; a de-rotating mechanism; an optical condenser said first collimator array and said second collimator array aligned with said rotary axes and relatively rotatable along said rotary axes and having a de-rotating mechanism positioned in the path between said first collimator array and said second collimator array, wherein is arranged for rotation around said rotary axes relative to each of said first and second collimator arrays at the rotational speed required to "de-rotate" the signal, wherein said optical condenser is positioned in the path between said first collimator array and the said de-rotating mechanism along the same rotary axis as said first collimator array.

2. The bi-directional multichannel fiber optic rotary joint according to claim 1, wherein said optical condenser further includes: a first optical refracting element; a second optical refracting element; wherein a plurality of optical signals pass through said first optical refracting element that condense the optical signals then pass the condensed optical signals through said second optical refracting element which makes all of the signals collinear.

3. The bi-directional multichannel fiber optic rotary joint according to claim 1, further comprising: wherein a plurality of optical signals originating from said first collimator array will be condensed by said optical condenser, and the optical signals are condensed by reduced the radia m distance between neighboring signals as well as the beam size of each signal thereby increasing the number of optical signals per square millimeter that allows more signals to pass through a de-rotating mechanism without increasing the size of the de-rotating mechanism and the de-rotated optical signals are finally recaptured by said second collimator array; and wherein a plurality of optical signals originating from said second collimator array are de-rotated by said de-rotating mechanism, and the optical signals are then expanded by said optical condenser, wherein the optical signals are passed in the reverse direction, said optical condenser functions as an optical expander, wherein expanding the optical signals by increased the distance between neighboring signals as well as the beam size of each signal thereby reducing the number of optical signals per square millimeter, the optical signals are then recaptured by said first collimator array.

4. A bi-directional multichannel fiber optic rotary joint comprising: a first collimator array with a rotary axis; a second collimator array with a rotary axis; a de-rotating mechanism; and an optical expander, wherein said first collimator array and said second collimator array are aligned with said rotary axes and relatively rotatable along said rotary axes and having a de-rotating mechanism positioned in the path between said first collimator array and said second collimator array, arranged for rotation around said rotary axes relative to each of said first and second collimator arrays at the rotational speed required to "de-rotate" the signal, wherein said optical expander is positioned in the path between said second collimator array and the said de-rotating mechanism along the same rotary axis as said second collimator array.

5. The bi-directional multichannel fiber optic rotary joint according to claim 4, wherein said optical expander further comprising: a first optical refracting element; and a second optical refracting element, wherein a plurality of optical signals pass through said first optical refracting element that condense the optical signals then pass the condensed optical signals through said second optical refracting element which makes all of the signals collinear.

6. The bi-directional multichannel fiber optic rotary joint according to claim 4, further comprising: wherein a plurality of optical signals originating from said first collimator array are de-rotated by said de-rotating mechanism; the optical signals are then expanded by said optical expander by increased the radial distance between neighboring optical signals as well as the beam size of each signal thereby reducing the number of optical signals per square millimeter before they are finally recaptured by said second collimator array; and wherein a plurality of optical signals originating from said second collimator array will be condensed by said optical expander, wherein the optical signal is passed in the reverse direction, said optical expander functions as an optical condenser, wherein the optical signals are condensed by reduced the distance between neighboring signals as well as the beam size of each signal thereby increasing the number of optical signals per square milli meter that allows more signals to pass through a de-rotating mechanism without increasing the size of the de-rotating mechanism and the de-rotated optical signals are finally recaptured by said first collimator array.

7. A bi-directional multichannel fiber optic rotary joint comprising: a first collimator array with a rotary axis; a second collimator array with a rotary axis; a de-rotating mechanism; an optical condenser; an optical expander; and said first collimator array and said second collimator array are aligned with said rotary axes and relatively rotatable along said rotary axes and having a de-rotating mechanism positioned in the path between said first collimator array and said second collimator array, arranged for rotation around said rotary axes relative to each of said first and second collimator arrays at the rotational speed required to "de-rotate" the signal; said optical condenser is positioned in the path between said first collimator array and the said do-rotating mechanism along the same rotary axis as said first collimator array; In addition, said optical expander is positioned in the path between said second collimator array and the said de-rotating mechanism along the same rotary axis as said second collimator array.

8. The bi-directional multichannel fiber optic rotary joint according to claim 7, wherein said optical condenser further comprising:

a first optical refracting element; a second optical refracting element; wherein a plurality of optical signal pass through said first optical refracting element that condense the optical signals then pass the condensed optical signals through said second optical refracting element which makes all of the signals collinear, wherein said an optical expander having a third optical refracting element and a fourth optical refracting element; and wherein passing through said third optical refracting element, a plurality of optical signals pass will be expanded, then the expanded optical signals through said fourth optical refracting element which makes all of the signals collinear.

9. The bi-directional multichannel fiber optic rotary joint according to claim 7, further comprising: wherein a plurality of optical signals originating from said first collimator array will be condensed by said optical condenser wherein the optical signals are condensed by reduced the radial distance between neighboring signals as well as the beam size of each signal thereby increasing the number of optical signals per square millimeter that allows more signals to pass through a de-rotating mechanism without increasing the size of the de-rotating mechanism, and the de-rotated optical signals are expanded by said optical expander, wherein expanding the signals by increased the distance between neighboring signals as well as the beam size of each signal thereby reducing the number of optical signals per square millimeter, increasing the ease with which each signal can be captured by the collimators, and finally recaptured by said second collimator array; and wherein a plurality of optical signals originating from said second collimator array will be condensed by said optical expander, wherein the optical signal is passed in the reverse direction, said optical expander functions as an optical condenser, wherein the optical signals are condensed by reducing the distance between neighboring signals as well as the beam size of each signal thereby increasing the number of optical signals per square milli meter that allows more signals to pass through a de-rotating mechanism without increasing the size of the de-rotating mechanism, and the de-rotated optical signals are expanded by said optical condenser, wherein expanding the signals by increasing the distance between neighboring signals as well as the beam size of each signal thereby reducing the number of optical signals per square millimeter increasing the ease with which each signal can be captured by the collimators, and finally recaptured by said first collimator array.

10. The bi-directional multichannel fiber optic rotary joint of claim 1 filled with a compressible or an incompressible fluid.

11. The bi-directional multichannel fiber optic rotary joint of claim 4 filled with a compressible or an incompressible fluid.

12. The bi-directional multichannel fiber optic rotary joints of claim 7 filled with a compressible or an incompressible fluid.

* * * * *